(12) United States Patent
Mueller et al.

(10) Patent No.: US 6,893,564 B2
(45) Date of Patent: May 17, 2005

(54) SHAPED BODIES CONTAINING METAL-ORGANIC FRAMEWORKS

(75) Inventors: Ulrich Mueller, Neustadt (DE); Lisa Lobree, Mannheim (DE); Michael Hesse, Worms (DE); Omar Yaghi, Ann Arbor, MI (US); Mohamed Eddaoudi, Ann Arbor, MI (US)

(73) Assignees: BASF Aktiengesellschaft, Ludwigshafen (DE); The Regents of the University of Michigan, Ann Arbor, MI (US)

( * ) Notice: Subject to any disclaimer, the term of this patent is extended or adjusted under 35 U.S.C. 154(b) by 118 days.

(21) Appl. No.: 10/157,182

(22) Filed: May 30, 2002

(65) Prior Publication Data

US 2003/0222023 A1 Dec. 4, 2003

(51) Int. Cl.⁷ ............................. B01D 39/00; C07F 9/00
(52) U.S. Cl. ................. 210/502.1; 210/503; 210/510.1; 502/151; 502/152; 502/153; 502/154; 540/465; 554/225; 264/239
(58) Field of Search .............................. 210/502.1, 503, 210/510.1, 502; 502/150, 151, 152, 153, 154, 401; 540/465; 554/225; 264/239

(56) References Cited

U.S. PATENT DOCUMENTS

| 4,161,461 A | * | 7/1979 | Caunt et al. ................. 502/105 |
| 5,648,508 A |  | 7/1997 | Yaghi |
| 6,384,253 B1 | * | 5/2002 | Khan .......................... 556/44 |
| 2003/0078311 A1 | * | 4/2003 | Muller et al. ................ 521/155 |
| 2003/0148165 A1 | * | 8/2003 | Muller et al. .................. 429/34 |
| 2004/0097724 A1 | * | 5/2004 | Muller et al. ................ 540/465 |

FOREIGN PATENT DOCUMENTS

| EP | 0 790 253 | 8/1997 |
| WO | 99/05151 | 2/1999 |
| WO | 02/070526 | 9/2002 |
| WO | 02/088148 | 11/2002 |
| WO | 03/035717 | 5/2003 |

OTHER PUBLICATIONS

Kerpert, et al., "A Porous Chiral Framework of Coordinated 1,3,5–Benzenetricarboxylate: Quadruple Interpenetration of the (10,3)–A Network," Chemical Communications, Royal Society of Chemistry, GB, vol. 1, 1998, pp. 31–32.
Yahgi, et al., "Selective Binding and Removal of Guests in a Microporous Metal–Organic Framework," Nature, Macmillan Journals Ltd., London, GB, vol. 378, No. 6558, Dec. 14, 1995, pp. 703–706.
Yaghi, et al., "Constructions of Porous Solids from Hydrogen–Bonded Metal Complexes of 1,3,5–Benezenetricarboxylic Acid," Journal of the Americal Chemical Society, American Chemical Society, Washington, DC, US, vol. 118, No. 38, 1996, pp. 9096–9101.
Derwent Abstracts, DE 100 32 885, Jan. 17, 2002.
Derwent Abstracts, DE 100 32 884, Jan. 24, 2002.
Derwent Abstracts, DE 100 15 246, Oct. 4, 2001.
Derwetn Abstracts, WO 2000/07 965, Feb. 17, 2000.
M. O. Keeffe, et al., Journal of Solid State Chemistry, 152, pp. 3–20, "Frameworks for Extended Solids: Geometrical Design Principles", 2000.
H. Li, et al., Letters to nature, vol. 402, pp. 276–279, "Design and Synthesis of an Exceptionally Stable and Highly Porous Metal–Organic Framework", Nov. 18, 1999.
M. Eddaoudi, et al., Topics in Catalysis, vol. 9, pp. 105–111, "Design and Synthesis of Metal–Carboxylate Frameworks with Permanent Microporosity", 1999.
B. Chen, et al., Science, vol. 291, pp. 1021–1023, "Interwoven Metal–Organic Framework on a Periodic Minimal Surface with Extra–Large Pores", Feb. 9, 2001.

* cited by examiner

Primary Examiner—John Kim
(74) Attorney, Agent, or Firm—Oblon, Spivak, McClelland, Maier & Neustadt, P.C.

(57) ABSTRACT

The present invention relates to a novel class of shaped bodies containing metal-organic frameworks. Said metal-organic frameworks comprise at least one metal ion and at least one at least bidentate organic compound and contain at least one type of micro- and mesopores or micro- or mesopores. Said shaped bodies comprise at least one metal-organic framework material and may optionally contain further substances, in particular at least one supporting material.

23 Claims, No Drawings

SHAPED BODIES CONTAINING METAL-ORGANIC FRAMEWORKS

The present invention relates to a novel class of shaped bodies containing metal-organic frameworks. Said metal-organic frameworks comprise at least one metal ion and at least one at least bidentate organic compound and at least one type of micro- and mesopores or micro- or mesopores. Said shaped bodies comprise at least one metal-organic framework material and may optionally contain further substances, in particular at least one supporting material.

Materials displaying a large internal surface area, preferably defined by pores or channels, are of predominant interest for applications in catalysis, for absorption and/or adsorption techniques, ion exchanging, chromatography, storage and/or uptake of substances, among others. The preparation of solid porous materials according to the present state of the art is described, for example, in *Preparation of Solid Catalysts*, Gerhard Ertl, Helmut Knözinger, Jens Weitkamp (Eds.), Wiley VCH, Weinheim, 1999. Here, solid porous materials are prepared by precipitation, sol-gel processes, spray-drying, foaming etc.

In a promising novel and alternative synthesis strategy to create micro- and/or mesoporous active materials, metal ions and molecular organic building blocks are used to form so-called metal-organic frameworks (MOFs). The metal-organic framework materials as such are described, for example, in U.S. Pat. No. 5,648,508, EP-A-0 709 253, M. O'Keeffe et al., *J. Sol. State Chem.*, 152 (2000) p. 3–20, H. Li et al., *Nature* 402 (1999) p. 276 seq., M. Eddaoudi et al., *Topics in Catalysis* 9 (1999) p. 105–111, B. Chen et al., *Science* 291 (2001) p. 1021–23. Among the advantages of these novel materials, in particular for applications in catalysis, are the following: (i) larger pore sizes can be realized than for the zeolites used presently (ii) the internal surface area is larger than for porous materials used presently (iii) pore size and/or channel structure can be tailored over a large range, (iv) the organic framework components forming the internal surface can be functionalized easily.

However these novel porous materials as such, based on metal-organic frame-works, are generally obtained as small crystallites or powders and—in this form—cannot be put to use in applications that require shaped bodies.

It is therefore an object of the present invention to provide a shaped body displaying the characteristic properties of the materials containing metal-organic frameworks. The term "shaped body" as used in the present invention thereby refers to shaped bodies obtained by molding processes and to shaped bodies obtained by applying the active material onto a (porous) substrate. The term "shaped body" will be defined further below.

This object is solved by subjecting at least one material containing a metal-organic framework comprising pores and at least one metal ion and at least one at least bidentate organic compound, which is coordinately bound to said metal ion, to a molding step or to apply said material onto a substrate or to perform a combination of both operations. Thus, the present invention relates to a metal-organic framework material comprising pores and at least one metal ion and at least one at least bidentate organic compound, which is coordinately bounded to said metal ion characterized in that it is in the form of a shaped body, a process for manufacturing the metal-organic framework material that is in the form of a shaped body as described herein, characterized in that the shaped body is obtained by at least one step of molding, a process for manufacturing a metal-organic framework material that is in the form of a shaped body as described herein, characterized in that the shaped body is obtained by contacting at least one metal-organic framework material with at least one substrate, and the use of said framework materials as described herein, as catalyst, support for catalysts, for sorption, storage of fluids; as desiccant, ion exchanger material, molecular sieve (separator), material for chromatography, material for the selective release and/or uptaking of molecules, molecular recognition, nanotubes, nano-reactors.

As has been mentioned above, the metal-organic framework material is described in, for example, U.S. Pat. No. 5,648,508, EP-A-0 709 253, M. O'Keeffe et al., *J. Sol. State Chem.*, 152 (2000) p. 3–20, H. Li et al., *Nature* 402 (1999) p. 276 seq., M. Eddaoudi et al., *Topics in Catalysis* 2 (1999) p. 105–111, B. Chen et al., *Science* 291 (2001) p. 1021–23. An inexpensive way for the preparation of said materials is the subject of DE 10111230.0. The content of these publications, to which reference is made herein, is fully incorporated in the content of the present application.

The metal-organic framework materials, as used in the present invention, comprise pores, particularly micro- and/or mesopores. Micropores are defined as being pores having a diameter of 2 nm or below and mesopores as being pores having a diameter in the range of 2 nm to 50 nm, according to the definition given in *Pure Applied Chem.* 45, p. 71 seq., particularly on p. 79 (1976). The presence of the micro- and/or mesopores can be monitored by sorption measurements which determine the capacity of the metal-organic framework materials for nitrogen uptake at 77 K according to DIN 66131 and/or DIN 66134.

For example, a type-I-form of the isothermal curve indicates the presence of micropores [see, for example, paragraph 4 of M. Eddaoudi et al., *Topics in Catalysis* 9 (1999)]. In a preferred embodiment, the specific surface area, as calculated according to the Langmuir model (DIN 66131, 66134) preferably is above 5 $m^2/g$, further preferred above 10 $m^2/g$, more preferably above 50 $m^2/g$, particularly preferred above 500 $m^2/g$ and may increase into the region above 3000 $m^2/g$.

As to the metal component within the framework material that is to be used according to the present invention, particularly to be mentioned are the metal ions of the main group elements and of the subgroup elements of the periodic system of the elements, namely of the groups Ia, Ia, IIIa, IVa to VIIIa and Ib to VIb. Among those metal components, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi, more preferably to Zn, Cu, Ni, Pd, Pt, Ru, Rh and Co. As to the metal ions of these elements, particular reference is made to: $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$.

With regard to the preferred metal ions and further details regarding the same, particular references is made to: U.S. Pat. No. 5,648,508, particularly to col. 11, lines 10*ff*, section "The Metal Ions" which section is incorporated herein by reference.

In addition to the metal salts disclosed in EP-A 0 790 253 and U.S. Pat. No. 5,648,508, other metallic compounds can be used, such as sulfates, phosphates and other complex counter-ion metal salts of the main- and subgroup metals of the periodic system of the elements. Metal oxides, mixed oxides and mixtures of metal oxides and/or mixed oxides with or without a defined stoichiometry are preferred. All of the above mentioned metal compounds can be soluble or insoluble and they may be used as starting material either in form of a powder or as a shaped body or as any combination thereof.

As to the at least bidentate organic compound, which is capable of coordination with the metal ion, in principle all compounds can be used which are suitable for this purpose and which fulfill the above requirements of being at least bidentate. Said organic compound must have at least two centers, which are capable to coordinate the metal ions of a metal salt, particularly with the metals of the aforementioned groups. With regard to the at least bidentate organic compound, specific mention is to be made of compounds having i) an alkyl group substructure, having from 1 to 10 carbon atoms,
ii) an aryl group substructure, having from 1 to 5 phenyl rings,
iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, at least one hetero atom comprising aromatic di-, tri- and tetracarboxylic acids, which have one or more nuclei.

A preferred ligand is 1,3,5-benzene tricarboxylic acid (BCT). Further preferred ligands are ADC (acetylene dicarboxylate), NDC (naphtalene dicarboxylate), BDC (benzene dicarboxylate), ATC (adamantane tetracarboxylate), BTC (benzene tricarboxylate), BTB (benzene tribenzoate), MTB (methane tetrabenzoate) and ATB (adamantane tribenzoate).

Besides the at least bidentate organic compound, the framework material as used in accordance with the present invention may also comprise one or more monodentate ligand(s), which is/are preferably selected from the following monodentate substances and/or derivatives thereof:

a. alkyl amines and their corresponding alkyl ammonium salts, containing linear, branched, or cyclic aliphatic groups, having from 1 to 20 carbon atoms (and their corresponding ammonium salts);
b. aryl amines and their corresponding aryl ammonium salts having from 1 to 5 phenyl rings;
c. alkyl phosphonium salts, containing linear, branched, or cyclic aliphatic groups, having from 1 to 20 carbon atoms;
d. aryl phosphonium salts, having from 1 to 5 phenyl rings;
e. alkyl organic acids and the corresponding alkyl organic anions (and salts) containing linear, branched, or cyclic aliphatic groups, having from 1 to 20 carbon atoms;
f. aryl organic acids and their corresponding aryl organic anions and salts, having from 1 to 5 phenyl rings;
g. aliphatic alcohols, containing linear, branched, or cyclic aliphatic groups, having from 1 to 20 carbon atoms;
h. aryl alcohols having from 1 to 5 phenyl rings;
i. inorganic anions from the group consisting of:
   sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and the corresponding acids and salts of the aforementioned inorganic anions,
J. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

Further details regarding the at least bidentate organic compounds and the monodentate substances, from which the ligands of the framework material as used in the present application are derived, can be taken from EP-A 0 790 253, whose respective content is incorporated into the present application by reference.

Within the present application, framework materials of the kind described herein, which comprise $Zn^{2+}$ as a metal ion and ligands derived from terephthalic acid as the bidentate compound, are particularly preferred. Said framework materials are known as MOF-5 in the literature.

Further metal ions, at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE 10111230.0.

As solvents, which are particularly useful for the preparation of MOF-5, in addition to the solvents disclosed in the above-referenced literature, dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The pore sizes of the metal-organic framework can be adjusted by selecting suitable organic ligands and/or bidendate compounds (=linkers). Generally, the larger the linker, the larger the pore size. Any pore size that is still supported by a the metal-organic framework in the absence of a host and at temperatures of at least 200° C. is conceivable. Pore sizes ranging from 0.2 nm to 30 nm are preferred, with pore sizes ranging from 0.3 nm to 3 nm being particularly preferred.

In the following, examples of metal-organic framework materials (MOFs) are given to illustrate the general concept given above. These specific examples, however, are not meant to limit the generality and scope of the present application.

By way of example, a list of metal-organic framework materials already synthesized and characterized is given below. This also includes novel isoreticular metal organic framework materials (IR-MOFs), which may be used in the framework of the present application. Such materials having the same framework topology while displaying different pore sizes and crystal densities are described, for example in M. Eddouadi et al., *Science* 295 (2002) 469, which is incorporated into the present application by reference.

The solvents used are of particular importance for the synthesis of these materials and are therefore mentioned in the table. The values for the cell parameters (angles $\alpha$, $\beta$ and $\gamma$ as well as the spacings a, b and c, given in Angstrom) have been obtained by x-ray diffraction and represent the space group given in the table as well.

| MOF-n | Ingredients molar ratios M + L | Solvents | α | β | γ | a | b | c | Space Group |
|---|---|---|---|---|---|---|---|---|---|
| MOF-0 | Zn(NO₃)₂.6H₂O H₃(BTC) | ethanol | 90 | 90 | 120 | 16.711 | 16.711 | 14.189 | P6(3)/Mcm |
| MOF-2 | Zn(NO₃)₂.6H₂O (0.246 mmol) H₂(BDC) 0.241 mmol) | DMF toluene | 90 | 102.8 | 90 | 6.718 | 15.49 | 12.43 | P2(1)/n |
| MOF-3 | Zn(NO₃)₂.6H₂O (1.89 mmol) H₂(BDC) (1.93 mmol) | DMF MeOH | 99.72 | 111.11 | 108.4 | 9.726 | 9.911 | 10.45 | P-1 |
| MOF-4 | Zn(NO₃)₂.6H₂O (1.00 mmol) H₃(BTC) (0.5 mmol) | ethanol | 90 | 90 | 90 | 14.728 | 14.728 | 14.728 | P2(1)3 |
| MOF-5 | Zn(NO₃)₂.6H₂O (2.22 mmol) H₂(BDC) (2.17 mmol) | DMF chlorobenzene | 90 | 90 | 90 | 25.669 | 25.669 | 25.669 | Fm-3m |
| MOF-38 | Zn(NO₃)₂.6H₂O (0.27 mmol) H₃(BTC) (0.15 mmol) | DMF chlorobenzene | 90 | 90 | 90 | 20.657 | 20.657 | 17.84 | I4cm |
| MOF-31 Zn(ADC)₂ | Zn(NO₃)₂.6H₂O 0.4 mmol H₂(ADC) 0.8 mmol | ethanol | 90 | 90 | 90 | 10.821 | 10.821 | 10.821 | Pn(-3)m |
| MOF-12 Zn₂(ATC) | Zn(NO₃)₂.6H₂O 0.3 mmol H₄(ATC) 0.15 mmol | ethanol | 90 | 90 | 90 | 15.745 | 16.907 | 18.167 | Pbca |
| MOF-20 ZnNDC | Zn(NO₃)₂.6H₂O 0.37 mmol H₂NDC 0.36 mmol | DMF chlorobenzene | 90 | 92.13 | 90 | 8.13 | 16.444 | 12.807 | P2(1)/c |
| MOF-37 | Zn(NO₃)₂.6H₂O 0.2 mmol H₂NDC 0.2 mmol | DEF chlorobenzene | 72.38 | 83.16 | 84.33 | 9.952 | 11.576 | 15.556 | P-1 |
| MOF-8 Tb₂(ADC) | Tb(NO₃)₃.5H₂O 0.10 mmol H₂ADC 0.20 mmol | DMSO MeOH | 90 | 115.7 | 90 | 19.83 | 9.822 | 19.183 | C2/c |
| MOF-9 Tb₂(ADC) | Tb(NO₃)₃.5H₂O 0.08 mmol H₂ADB 0.12 mmol | DMSO | 90 | 102.09 | 90 | 27.056 | 16.795 | 28.139 | C2/c |
| MOF-6 | Tb(NO₃)₃.5H₂O 0.30 mmol H₂(BDC) 0.30 mmol | DMF MeOH | 90 | 91.28 | 90 | 17.599 | 19.996 | 10.545 | P21/c |
| MOF-7 | Tb(NO₃)₃.5H₂O 0.15 mmol H₂(BDC) 0.15 mmol | H₂O | 102.3 | 91.12 | 101.5 | 6.142 | 10.069 | 10.096 | P-1 |
| MOF-69A | Zn(NO₃)₂.6H₂O 0.083 mmol 4,4'BPDC 0.041 mmol | DEF H₂O₂ MeNH₂ | 90 | 111.6 | 90 | 23.12 | 20.92 | 12 | C2/c |
| MOF-69B | Zn(NO₃)₂.6H₂O 0.083 mmol 2,6-NCD 0.041 mmol | DEF H₂O₂ MeNH₂ | 90 | 95.3 | 90 | 20.17 | 18.55 | 12.16 | C2/c |
| MOF-11 Cu₂(ATC) | Cu(NO₃)₂2.5H₂O 0.47 mmol H₂ATC 0.22 mmol | H₂O | 90 | 93.86 | 90 | 12.987 | 11.22 | 11.336 | C2/c |
| MOF-11 Cu₂(ATC) dehydr. | | | 90 | 90 | 90 | 8.4671 | 8.4671 | 14.44 | P42/mmc |
| MOF-14 Cu₃(BTB) | Cu(NO₃)₂2.5H₂O 0.28 mmol H₃BTB 0.052 mmol | H₂O DMF EtOH | 90 | 90 | 90 | 26.946 | 26.946 | 26.946 | Im-3 |

-continued

| MOF-n | Ingredients molar ratios M + L | Solvents | α | β | γ | a | b | c | Space Group |
|---|---|---|---|---|---|---|---|---|---|
| MOF-32 Cd(ATC) | Cd(NO$_3$)$_2$.4H$_2$O 0.24 mmol H$_4$ATC 0.10 mmol | H$_2$O NaOH | 90 | 90 | 90 | 13.468 | 13.468 | 13.468 | P(−4)3m |
| MOF-33 Zn$_2$(ATB) | ZnCl$_2$ 0.15 mmol H$_4$ATB 0.02 mmol | H$_2$O DMF EtOH | 90 | 90 | 90 | 19.561 | 15.255 | 23.404 | Imma |
| MOF-34 Ni(ATC) | Ni(NO$_3$)$_2$.6H$_2$O 0.24 mmol H$_4$ATC 0.10 mmol | H$_2$O NaOH | 90 | 90 | 90 | 10.066 | 11.163 | 19.201 | P2$_1$2$_1$2$_1$ |
| MOF-36 Zn$_2$(MTB) | Zn(NO$_3$)$_2$.4H$_2$O 0.20 mmol H$_4$MTB 0.04 mmol | H$_2$O DMF | 90 | 90 | 90 | 15.745 | 16.907 | 18.167 | Pbca |
| MOF-39 Zn$_3$O(HBTB) | Zn(NO$_3$)$_2$ 4H$_2$O 0.27 mmol H$_3$BTB 0.07 mmol | H$_2$O DMF EtOH | 90 | 90 | 90 | 17.158 | 21.591 | 25.308 | Pnma |
| NO305 | FeCl$_2$.4H$_2$O 5.03 mmol formic acid 86.90 mmol | DMF | 90 | 90 | 120 | 8.2692 | 8.2692 | 63.566 | R-3c |
| NO306A | FeCl$_2$.4H$_2$O 5.03 mmol formic acid 86.90 mmol | DEF | 90 | 90 | 90 | 9.9364 | 18.374 | 18.374 | Pbcn |
| NO29 MOF-0 like | Mn(Ac)$_2$.4H$_2$O 0.46 mmol H$_3$BTC 0.69 mmol | DMF | 120 | 90 | 90 | 14.16 | 33.521 | 33.521 | P-1 |
| BPR48 A2 | Zn(NO$_3$)$_2$ 6H$_2$O 0.012 mmol H$_2$BDC 0.012 mmol | DMSO toluene | 90 | 90 | 90 | 14.5 | 17.04 | 18.02 | Pbca |
| BPR69 B1 | Cd(NO$_3$)$_2$ 4H$_2$O 0.0212 mmol H$_2$BDC 0.0428 mmol | DMSO | 90 | 98.76 | 90 | 14.16 | 15.72 | 17.66 | Cc |
| BPR92 A2 | Co(NO$_3$)$_2$.6H$_2$O 0.018 mmol H$_2$BDC 0.018 mmol | NMP | 106.3 | 107.63 | 107.2 | 7.5308 | 10.942 | 11.025 | P1 |
| BPR95 C5 | Cd(NO$_3$)$_2$ 4H$_2$O 0.012 mmol H$_2$BDC 0.36 mmol | NMP | 90 | 112.8 | 90 | 14.460 | 11.085 | 15.829 | P2(1)/n |
| Cu C$_6$H$_4$O$_6$ | Cu(NO$_3$)$_2$.2.5H$_2$O 0.370 mmol H$_2$BDC(OH)$_2$ 0.37 mmol | DMF chloro-benzene | 90 | 105.29 | 90 | 15.259 | 14.816 | 14.13 | P2(1)/c |
| M(BTC) MOF-0 like | Co(SO$_4$) H$_2$O 0.055 mmol H$_3$BTC 0.037 mmol | DMF | | Same as MOF-0 | | | | | |
| Tb(C$_6$H$_4$O$_6$) | Tb(NO$_3$)$_3$.5H$_2$O 0.370 mmol H$_2$(C$_6$H$_4$O$_6$) 0.56 mmol | DMF chloro-benzene | 104.6 | 107.9 | 97.147 | 10.491 | 10.981 | 12.541 | P-1 |
| Zn(C$_2$O$_4$) | ZnCl$_2$ 0.370 mmol oxalic acid 0.37 mmol | DMF chloro-benzene | 90 | 120 | 90 | 9.4168 | 9.4168 | 8.464 | P(−3)1m |
| Co(CHO) | Co(NO$_3$)$_2$.5H$_2$O 0.043 mmol formic acid 1.60 mmol | DMF | 90 | 91.32 | 90 | 11.328 | 10.049 | 14.854 | P2(1)/n |
| Cd(CHO) | Cd(NO$_3$)$_2$.4H$_2$O 0.185 mmol formic acid 0.185 mmol | DMF | 90 | 120 | 90 | 8.5168 | 8.5168 | 22.674 | R-3c |

-continued

| MOF-n | Ingredients molar ratios M + L | Solvents | α | β | γ | a | b | c | Space Group |
|---|---|---|---|---|---|---|---|---|---|
| Cu(C$_3$H$_2$O$_4$) | Cu(NO$_3$)$_2$.2.5H$_2$O 0.043 mmol malonic acid 0.192 mmol | DMF | 90 | 90 | 90 | 8.366 | 8.366 | 11.919 | P43 |
| Zn$_6$(NDC)$_5$ MOF-48 | Zn(NO$_3$)$_2$.6H$_2$O 0.097 mmol 14 NDC 0.069 mmol | DMF chlorobenzene H$_2$O$_2$ | 90 | 95.902 | 90 | 19.504 | 16.482 | 14.64 | C2/m |
| MOF-47 | Zn(NO$_3$)$_2$ 6H$_2$O 0.185 mmol H$_2$(BDC[CH$_3$]$_4$) 0.185 mmol | DMF chlorobenzene H$_2$O$_2$ | 90 | 92.55 | 90 | 11.303 | 16.029 | 17.535 | P2(1)/c |
| MO25 | Cu(NO$_3$)$_2$.2.5H$_2$O 0.084 mmol BPhDC 0.085 mmol | DMF | 90 | 112.0 | 90 | 23.880 | 16.834 | 18.389 | P2(1)/c |
| Cu-Thio | Cu(NO$_3$)$_2$.2.5H$_2$O 0.084 mmol thiophene dicarboxylic 0.085 mmol | DEF | 90 | 113.6 | 90 | 15.4747 | 14.514 | 14.032 | P2(1)/c |
| ClBDC1 | Cu(NO$_3$)$_2$.2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$.2.5H$_2$O 0.084 mmol BrBDC 0.085 mmol | DMF | 90 | 90 | 90 | 21.607 | 20.607 | 20.073 | Fm3m |
| Zn$_3$(BTC)$_2$ | ZnCl$_2$ 0.033 mmol H$_3$BTC 0.033 mmol | DMF EtOH base added | 90 | 90 | 90 | 26.572 | 26.572 | 26.572 | Fm-3m |
| MOF-j | Co(CH$_3$CO$_2$)$_2$.4H$_2$O (1.65 mmol) H$_3$(BZC) (0.95 mmol) | H$_2$O | 90 | 112.0 | 90 | 17.482 | 12.963 | 6.559 | C2 |
| MOF-n | Zn(NO$_3$)$_2$.6H$_2$O H$_3$(BTC) | ethanol | 90 | 90 | 120 | 16.711 | 16.711 | 14.189 | P6(3)/mcm |
| PbBDC | Pb(NO$_3$)$_2$ (0.181 mmol) H$_2$(BDC) (0.181 mmol) | DMF ethanol | 90 | 102.7 | 90 | 8.3639 | 17.991 | 9.9617 | P2(1)/n |
| Znhex | Zn(NO$_3$)$_2$.6H$_2$O (0.171 mmol) H$_3$BTB (0.114 mmol) | DMF p-xylene ethanol | 90 | 90 | 120 | 37.1165 | 37.117 | 30.019 | P3(1)c |
| AS16 | FeBr$_2$ 0.927 mmol H$_2$(BDC) 0.927 mmol | DMF anhydr. | 90 | 90.13 | 90 | 7.2595 | 8.7894 | 19.484 | P2(1)c |
| AS27-2 | FeBr$_2$ 0.927 mmol H$_3$(BDC) 0.464 mmol | DMF anhydr. | 90 | 90 | 90 | 26.735 | 26.735 | 26.735 | Fm3m |
| AS32 | FeCl$_3$ 1.23 mmol H$_2$(BDC) 1.23 mmol | DMF anhydr. ethanol | 90 | 90 | 120 | 12.535 | 12.535 | 18.479 | P6(2)c |
| AS54-3 | FeBr$_2$ 0.927 BPDC 0.927 mmol | DMF anhydr. n-propanol | 90 | 109.98 | 90 | 12.019 | 15.286 | 14.399 | C2 |
| AS61-4 | FeBr$_2$ 0.927 mmol m-BDC 0.927 mmol | pyridine anhydr. | 90 | 90 | 120 | 13.017 | 13.017 | 14.896 | P6(2)c |
| AS68-7 | FeBr$_2$ 0.927 mmol m-BDC 1.204 mmol | DMF anhydr. Pyridine | 90 | 90 | 90 | 18.3407 | 10.036 | 18.039 | Pca2$_1$ |
| Zn(ADC) | Zn(NO$_3$)$_2$.6H$_2$O 0.37 mmol H$_2$(ADC) 0.36 mmol | DMF chlorobenzene | 90 | 99.85 | 90 | 16.764 | 9.349 | 9.635 | C2/c |

-continued

| MOF-n | Ingredients molar ratios M + L | Solvents | α | β | γ | a | b | c | Space Group |
|---|---|---|---|---|---|---|---|---|---|
| MOF-12 $Zn_2$(ATC) | $Zn(NO_3)_2 \cdot 6H_2O$ 0.30 mmol $H_4$(ATC) 0.15 mmol | ethanol | 90 | 90 | 90 | 15.745 | 16.907 | 18.167 | Pbca |
| MOF-20 ZnNDC | $Zn(NO_3)_2 \cdot 6H_2O$ 0.37 mmol $H_2$NDC 0.36 mmol | DMF chloro-benzene | 90 | 92.13 | 90 | 8.13 | 16.444 | 12.807 | P2(1)/c |
| MOF-37 | $Zn(NO_3)_2 \cdot 6H_2O$ 0.20 mmol $H_2$NDC 0.20 mmol | DEF chloro-benzene | 72.38 | 83.16 | 84.33 | 9.952 | 11.576 | 15.556 | P-1 |
| Zn(NDC) (DMSO) | $Zn(NO_3)_2 \cdot 6H_2O$ $H_2$NDC | DMSO | 68.08 | 75.33 | 88.31 | 8.631 | 10.207 | 13.114 | P-1 |
| Zn(NDC) | $Zn(NO_3)_2 \cdot 6H_2O$ $H_2$NDC | | 90 | 99.2 | 90 | 19.289 | 17.628 | 15.052 | C2/c |
| Zn(HPDC) | $Zn(NO_3)_2 \cdot 4H_2O$ 0.23 mmol $H_2$(HPDC) 0.05 mmol | DMF $H_2O$ | 107.9 | 105.06 | 94.4 | 8.326 | 12.085 | 13.767 | P-1 |
| Co(HPDC) | $Co(NO_3)_2 \cdot 6H_2O$ 0.21 mmol $H_2$(HPDC) 0.06 mmol | DMF $H_2O$/ ethanol | 90 | 97.69 | 90 | 29.677 | 9.63 | 7.981 | C2/c |
| $Zn_3$(PDC)2.5 | $Zn(NO_3)_2 \cdot 4H_2O$ 0.17 mmol $H_2$(HPDC) 0.05 mmol | DMF/ ClBz $H_2O$/ TEA | 79.34 | 80.8 | 85.83 | 8.564 | 14.046 | 26.428 | P-1 |
| $Cd_2$(TPDC)2 | $Cd(NO_3)_2 \cdot 4H_2O$ 0.06 mmol $H_2$(HPDC) 0.06 mmol | methanol/ CHP $H_2O$ | 70.59 | 72.75 | 87.14 | 10.102 | 14.412 | 14.964 | P-1 |
| Tb(PDC)1.5 | $Tb(NO_3)_3 \cdot 5H_2O$ 0.21 mmol $H_2$(PDC) 0.034 mmol | DMF $H_2O$/ ethanol | 109.8 | 103.61 | 100.14 | 9.829 | 12.11 | 14.628 | P-1 |
| ZnDBP | $Zn(NO_3)_2 \cdot 6H_2O$ 0.05 mmol dibenzylphosphate 0.10 mmol | MeOH | 90 | 93.67 | 90 | 9.254 | 10.762 | 27.93 | P2/n |
| $Zn_3$(BPDC) | $ZnBr_2$ 0.021 mmol 4,4'BPDC 0.005 mmol | DMF | 90 | 102.76 | 90 | 11.49 | 14.79 | 19.18 | P21/n |
| CdBDC | $Cd(NO_3)_2 \cdot 4H_2O$ 0.100 mmol $H_2$(BDC) 0.401 mmol | DMF $Na_2SiO_3$ (aq) | 90 | 95.85 | 90 | 11.2 | 11.11 | 16.71 | P21/n |
| Cd-mBDC | $Cd(NO_3)_2 \cdot 4H_2O$ 0.009 mmol $H_2$(mBDC) 0.018 mmol | DMF $MeNH_2$ | 90 | 101.1 | 90 | 13.69 | 18.25 | 14.91 | C2/c |
| $Zn_4$OBNDC | $Zn(NO_3)_2 \cdot 6H_2O$ 0.041 mmol BNDC | DEF $MeNH_2$ $H_2O_2$ | 90 | 90 | 90 | 22.35 | 26.05 | 59.56 | Fmmm |
| Eu(TCA) | $Eu(NO_3)_3 \cdot 6H_2O$ 0.14 mmol TCA 0.026 mmol | DMF chloro-benzene | 90 | 90 | 90 | 23.325 | 23.325 | 23.325 | Pm-3n |
| Tb(TCA) | $Tb(NO_3)_3 \cdot 6H_2O$ 0.069 mmol TCA 0.026 mmol | DMF chloro-benzene | 90 | 90 | 90 | 23.272 | 23.272 | 23.372 | Pm-3n |
| Formate | $Ce(NO_3)_3 \cdot 6H_2O$ 0.138 mmol Formaic acid 0.43 mmol | $H_2O$ ethanol | 90 | 90 | 120 | 10.668 | 10.667 | 4.107 | R-3m |
| | $FeCl_2 \cdot 4H_2O$ 5.03 mmol Formic acid 86.90 mmol | DMF | 90 | 90 | 120 | 8.2692 | 8.2692 | 63.566 | R-3c |
| | $FeCl_2 \cdot 4H_2O$ 5.03 mmol Formic acid 86.90 mmol | DEF | 90 | 90 | 90 | 9.9364 | 18.374 | 18.374 | Pbcn |

-continued

| MOF-n | Ingredients molar ratios M + L | Solvents | α | β | γ | a | b | c | Space Group |
|---|---|---|---|---|---|---|---|---|---|
| | FeCl$_2$.4H$_2$O 5.03 mmol Formic acid 86.90 mmol | DEF | 90 | 90 | 90 | 8.335 | 8.335 | 13.34 | P-31c |
| NO330 | FeCl$_2$.4H$_2$O 0.50 mmol Formic acid 8.69 mmol | formamide | 90 | 90 | 90 | 8.7749 | 11.655 | 8.3297 | Pnna |
| NO332 | FeCl$_2$.4H$_2$O 0.50 mmol Formic acid 8.69 mmol | DIP | 90 | 90 | 90 | 10.0313 | 18.808 | 18.355 | Pbcn |
| NO333 | FeCl$_2$.4H$_2$O 0.50 mmol Formic acid 8.69 mmol | DBF | 90 | 90 | 90 | 45.2754 | 23.861 | 12.441 | Cmcm |
| NO335 | FeCl$_2$.4H$_2$O 0.50 mmol Formic acid 8.69 mmol | CHF | 90 | 91.372 | 90 | 11.5964 | 10.187 | 14.945 | P21/n |
| NO336 | FeCl$_2$.4H$_2$O 0.50 mmol Formic acid 8.69 mmol | MFA | 90 | 90 | 90 | 11.7945 | 48.843 | 8.4136 | Pbcm |
| NO13 | Mn(Ac)$_2$.4H$_2$O 0.46 mmol Bezoic acid 0.92 mmol Bipyridine 0.46 mmol | ethanol | 90 | 90 | 90 | 18.66 | 11.762 | 9.418 | Pbcn |
| NO29 MOF-0 Like | Mn(Ac)$_2$.4H$_2$O 0.46 mmol H$_3$BTC 0.69 mmol | DMF | 120 | 90 | 90 | 14.16 | 33.521 | 33.521 | P-1 |
| Mn(hfac)$_2$ (O$_2$CC$_6$H$_5$) | Mn(Ac)$_2$.4H$_2$O 0.46 mmol Hfac 0.92 mmol Bipyridine 0.46 mmol | ether | 90 | 95.32 | 90 | 9.572 | 17.162 | 14.041 | C2/c |
| BPR43G2 | Zn(NO$_3$)$_2$.6H$_2$O 0.0288 mmol H$_2$BDC 0.0072 mmol | DMF CH$_3$CN | 90 | 91.37 | 90 | 17.96 | 6.38 | 7.19 | C2/c |
| BPR48A2 | Zn(NO$_3$)$_2$ 6H$_2$O 0.012 mmol H$_2$BDC 0.012 mmol | DMSO toluene | 90 | 90 | 90 | 14.5 | 17.04 | 18.02 | Pbca |
| BPR49B1 | Zn(NO$_3$)$_2$ 6H$_2$O 0.024 mmol H$_2$BDC 0.048 mmol | DMSO methanol | 90 | 91.172 | 90 | 33.181 | 9.824 | 17.884 | C2/c |
| BPR56E1 | Zn(NO$_3$)$_2$ 6H$_2$O 0.012 mmol H$_2$BDC 0.024 mmol | DMSO n-propanol | 90 | 90.096 | 90 | 14.5873 | 14.153 | 17.183 | P2(1)/n |
| BPR68D10 | Zn(NO$_3$)$_2$ 6H$_2$O 0.0016 mmol H$_3$BTC 0.0064 mmol | DMSO benzene | 90 | 95.316 | 90 | 10.0627 | 10.17 | 16.413 | P2(1)/c |
| BPR69B1 | Cd(NO$_3$)$_2$ 4H$_2$O 0.0212 mmol H$_2$BDC 0.0428 mmol | DMSO | 90 | 98.76 | 90 | 14.16 | 15.72 | 17.66 | Cc |
| BPR73E4 | Cd(NO$_3$)$_2$ 4H$_2$O 0.006 mmol H$_2$BDC 0.003 mmol | DMSO toluene | 90 | 92.324 | 90 | 8.7231 | 7.0568 | 18.438 | P2(1)/n |
| BPR76D5 | Zn(NO$_3$)$_2$ 6H$_2$O 0.0009 mmol H$_2$BzPDC 0.0036 mmol | DMSO | 90 | 104.17 | 90 | 14.4191 | 6.2599 | 7.0611 | Pc |

-continued

| MOF-n | Ingredients molar ratios M + L | Solvents | α | β | γ | a | b | c | Space Group |
|---|---|---|---|---|---|---|---|---|---|
| BPR80B5 | Cd(NO$_3$)$_2$.4H$_2$O 0.018 mmol H$_2$BDC 0.036 mmol | DMF | 90 | 115.11 | 90 | 28.049 | 9.184 | 17.837 | C2/c |
| BPR80H5 | Cd(NO$_3$)$_2$ 4H$_2$O 0.027 mmol H$_2$BDC 0.027 mmol | DMF | 90 | 119.06 | 90 | 11.4746 | 6.2151 | 17.268 | P2/c |
| BPR82C6 | Cd(NO$_3$)$_2$ 4H$_2$O 0.0068 mmol H$_2$BDC 0.202 mmol | DMF | 90 | 90 | 90 | 9.7721 | 21.142 | 27.77 | Fdd2 |
| BPR86C3 | Co(NO$_3$)$_2$ 6H$_2$O 0.0025 mmol H$_2$BDC 0.075 mmol | DMF | 90 | 90 | 90 | 18.3449 | 10.031 | 17.983 | Pca2(1) |
| BPR86H6 | Cd(NO$_3$)$_2$.6H$_2$O 0.010 mmol H$_2$BDC 0.010 mmol | DMF | 80.98 | 89.69 | 83.412 | 9.8752 | 10.263 | 15.362 | P-1 |
|  | Co(NO$_3$)$_2$ 6H$_2$O | NMP | 106.3 | 107.63 | 107.2 | 7.5308 | 10.942 | 11.025 | P1 |
| BPR95A2 | Zn(NO$_3$)$_2$ 6H$_2$O 0.012 mmol H$_2$BDC 0.012 mmol | NMP | 90 | 102.9 | 90 | 7.4502 | 13.767 | 12.713 | P2(1)/c |
| CuC$_6$F$_4$O$_4$ | Cu(NO$_3$)$_2$.2.5H$_2$O 0.370 mmol H$_2$BDC(OH)$_2$ 0.37 mmol | DMF chloro- benzene | 90 | 98.834 | 90 | 10.9675 | 24.43 | 22.553 | P2(1)/n |
| Fe Formic | FeCl$_2$.4H$_2$O 0.370 mmol Formic acid 0.37 mmol | DMF | 90 | 91.543 | 90 | 11.495 | 9.963 | 14.48 | P2(1)/n |
| Mg Formic | Mg(NO$_3$)$_2$.6H$_2$O 0.370 mmol Formic acid 0.37 mmol | DMF | 90 | 91.359 | 90 | 11.383 | 9.932 | 14.656 | P2(1)/n |
| MgC$_6$H$_4$O$_6$ | Mg(NO$_3$)$_2$.6H$_2$O 0.370 mmol H$_2$BDC(OH)$_2$ 0.37 mmol | DMF | 90 | 96.624 | 90 | 17.245 | 9.943 | 9.273 | C2/c |
| Zn C$_2$H$_4$BDC MOF-38 | ZnCl$_2$ 0.44 mmol CBBDC 0.261 mmol | DMF | 90 | 94.714 | 90 | 7.3386 | 16.834 | 12.52 | P2(1)/n |
| MOF-49 | ZnCl$_2$ 0.44 mmol m-BDC 0.261 mmol | DMF CH3CN | 90 | 93.459 | 90 | 13.509 | 11.984 | 27.039 | P2/c |
| MOF-26 | Cu(NO$_3$)$_2$.5H$_2$O 0.084 mmol DCPE 0.085 mmol | DMF | 90 | 95.607 | 90 | 20.8797 | 16.017 | 26.176 | P2(1)/n |
| MOF-112 | Cu(NO$_3$)$_2$.2.5H$_2$O 0.084 mmol o-Br-m-BDC 0.085 mmol | DMF ethanol | 90 | 107.49 | 90 | 29.3241 | 21.297 | 18.069 | C2/c |
| MOF-109 | Cu(NO$_3$)$_2$.2.5H$_2$O 0.084 mmol KDB 0.085 mmol | DMF | 90 | 111.98 | 90 | 23.8801 | 16.834 | 18.389 | P2(1)/c |
| MOF-111 | Cu(NO$_3$)$_2$.2.5H$_2$O 0.084 mmol o-BrBDC 0.085 mmol | DMF ethanol | 90 | 102.16 | 90 | 10.6767 | 18.781 | 21.052 | C2/c |
| MOF-110 | Cu(NO$_3$)$_2$.2.5H$_2$O 0.084 mmol thiophene dicarboxylic 0.085 mmol | DMF | 90 | 90 | 120 | 20.0652 | 20.065 | 20.747 | R-3/m |
| MOF-107 | Cu(NO$_3$)$_2$.2.5H$_2$O 0.084 mmol thiophene dicarboxylic 0.085 mmol | DEF | 104.8 | 97.075 | 95.206 | 11.032 | 18.067 | 18.452 | P-1 |

-continued

| MOF-n | Ingredients molar ratios M + L | Solvents | α | β | γ | a | b | c | Space Group |
|---|---|---|---|---|---|---|---|---|---|
| MOF-108 | Cu(NO$_3$)$_2$.2.5H$_2$O 0.084 mmol thiophene dicarboxylic 0.085 mmol | DBF/ methanol | 90 | 113.63 | 90 | 15.4747 | 14.514 | 14.032 | C2/c |
| MOF-102 | Cu(NO$_3$)$_2$.2.5H$_2$O 0.084 mmol H$_2$(BDCCl$_2$) 0.085 mmol | DMF | 91.63 | 106.24 | 112.01 | 9.3845 | 10.794 | 10.831 | P-1 |
| Clbdc1 | Cu(NO$_3$)$_2$.2.5H$_2$O 0.084 mmol H$_2$(BDCCl$_2$) 0.085 mmol | DEF | 90 | 105.56 | 90 | 14.911 | 15.622 | 18.413 | P-1 |
| Cu(NMOP) | Cu(NO$_3$)$_2$.2.5H$_2$O 0.084 mmol NBDC 0.085 mmol | DMF | 90 | 102.37 | 90 | 14.9238 | 18.727 | 15.529 | P2(1)/m |
| Tb(BTC) | Tb(NO$_3$)$_3$.5H$_2$O 0.033 mmol H$_3$BTC 0.033 mmol | DMF | 90 | 106.02 | 90 | 18.6986 | 11.368 | 19.721 | |
| Zn$_3$(BTC)$_2$ Honk | ZnCl$_2$ 0.033 mmol H$_3$BTC 0.033 mmol | DMF ethanol | 90 | 90 | 90 | 26.572 | 26.572 | 26.572 | Fm-3m |
| Zn$_4$O(NDC) | Zn(NO$_3$)$_2$.4H$_2$O 0.066 mmol 14NDC 0.066 mmol | DMF ethanol | 90 | 90 | 90 | 41.5594 | 18.818 | 17.574 | aba2 |
| CdTDC | Cd(NO$_3$)$_2$.4H$_2$O 0.014 mmol thiophene 0.040 mmol DABCO 0.020 mmol | DMF H$_2$O | 90 | 90 | 90 | 12.173 | 10.485 | 7.33 | Pmma |
| IRMOF-2 | Zn(NO$_3$)$_2$.4H$_2$O 0.160 mmol o-Br-BDC 0.60 mmol | DEF | 90 | 90 | 90 | 25.772 | 25.772 | 25.772 | Fm-3m |
| IRMOF-3 | Zn(NO$_3$)$_2$.4H$_2$O 0.20 mmol H$_2$N-BDC 0.60 mmol | DEF ethanol | 90 | 90 | 90 | 25.747 | 25.747 | 25.747 | Fm-3m |
| IRMOF-4 | Zn(NO$_3$)$_2$.4H$_2$O 0.11 mmol [C$_3$H$_7$O]$_2$-BDC 0.48 mmol | DEF | 90 | 90 | 90 | 25.849 | 25.849 | 25.849 | Fm-3m |
| IRMOF-5 | Zn(NO$_3$)$_2$.4H$_2$O 0.13 mmol [C$_5$H$_{11}$O]$_2$-BDC 0.50 mmol | DEF | 90 | 90 | 90 | 12.882 | 12.882 | 12.882 | Pm-3m |
| IRMOF-6 | Zn(NO$_3$)$_2$.4H$_2$O 0.20 mmol [C$_2$H$_4$]-BDC 0.60 mmol | DEF | 90 | 90 | 90 | 25.842 | 25.842 | 25.842 | Fm-3m |
| IRMOF-7 | Zn(NO$_3$)$_2$.4H$_2$O 0.07 mmol 1,4NDC 0.20 mmol | DEF | 90 | 90 | 90 | 12.914 | 12.914 | 12.914 | Pm-3m |
| IRMOF-8 | Zn(NO$_3$)$_2$.4H$_2$O 0.55 mmol 2,6NDC 0.42 mmol | DEF | 90 | 90 | 90 | 30.092 | 30.092 | 30.092 | Fm-3m |
| IRMOF-9 | Zn(NO$_3$)$_2$.4H$_2$O 0.05 mmol BPDC 0.42 mmol | DEF | 90 | 90 | 90 | 17.147 | 23.322 | 25.255 | Pnnm |
| IRMOF-10 | Zn(NO$_3$)$_2$.4H$_2$O 0.02 mmol BPDC 0.012 mmol | DEF | 90 | 90 | 90 | 34.281 | 34.281 | 34.281 | Fm-3m |
| IRMOF-11 | Zn(NO$_3$)$_2$.4H$_2$O 0.05 mmol HPDC 0.20 mmol | DEF | 90 | 90 | 90 | 24.822 | 24.822 | 56.734 | R-3m |

-continued

| MOF-n | Ingredients molar ratios M + L | Solvents | α | β | γ | a | b | c | Space Group |
|---|---|---|---|---|---|---|---|---|---|
| IRMOF-12 | Zn(NO$_3$)$_2$.4H$_2$O 0.017 mmol HPDC 0.12 mmol | DEF | 90 | 90 | 90 | 34.281 | 34.281 | 34.281 | Fm-3m |
| IRMOF-13 | Zn(NO$_3$)$_2$.4H$_2$O 0.048 mmol PDC 0.31 mmol | DEF | 90 | 90 | 90 | 24.822 | 24.822 | 56.734 | R-3m |
| IRMOF-14 | Zn(NO$_3$)$_2$.4H$_2$O 0.17 mmol PDC 0.12 mmol | DEF | 90 | 90 | 90 | 34.381 | 34.381 | 34.381 | Fm-3m |
| IRMOF-15 | Zn(NO$_3$)$_2$.4H$_2$O 0.063 mmol TPDC 0.025 mmol | DEF | 90 | 90 | 90 | 21.459 | 21.459 | 21.459 | Im-3m |
| IRMOF-16 | Zn(NO$_3$)$_2$.4H$_2$O 0.0126 mmol TPDC 0.05 mmol | DEF NMP | 90 | 90 | 90 | 21.49 | 21.49 | 21.49 | Pm-3m |

ADC Acetylene dicarboxylic acid
NDC Naphtalene dicarboxylic acid
BDC Benzene dicarboxylic acid
ATC Adamantane tetracarboxylic acid
BTC Benzene tricarboxylic acid
BTB Benzene tribenzoate
MTB Methane tetrabenzoate
ATB Adamantane tetrabenzoate
ADB Adamantane dibenzoate Examples for the synthesis of these materials as such can, for example, be found in: J. Am. Chem. Soc. 123 (2001) pages 8241 seq. or in Acc. Chem. Res. 31 (1998) pages 474 seq., which are fully encompassed within the content of the present application with respect to their respective content.

The separation of the framework materials, particularly of MOF-5, from the mother liquor of the crystallization may be achieved by procedures known in the art such as solid-liquid separations, centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, as well as by evaporation of the mother liquor at elevated temperature and/or in vacuo and concentrating of the solid. The material obtained in this step is typically a fine powder and cannot be used for most practical applications, e.g., in catalysis, where shaped bodies are required.

In the context of the present invention, the term "shaped body" refers to any solid body that has at least a two-dimensional outer contour and extends to at least 0.02 mm in at least one direction in space. No other restrictions apply, i.e., the body may take any conceivable shape and may extend in any direction by any length so long as it extends to at least 0.02 mm in one direction. In a preferred embodiment, the shaped bodies do not extend to more than 50 mm and not to less than 0.02 mm in all directions. In a further preferred embodiment, this range is limited from 1.5 mm to 5 mm.

As far as the geometry of these shaped bodies is concerned, spherical or cylindrical bodies are preferred, as well as disk-shaped pellets or any other suitable geometry. such as honeycombs, meshes, hollow bodies, wire arrangements etc.

To form shaped bodies containing an active material, for example a catalytically active material, several routes exist. Among them (i) molding the active material alone or the active material in combination with a binder and/or other components into a shaped body, for example by pelletizing;
(ii) applying the active material onto a (porous) substrate, and
(iii) supporting an active material on a porous or non-porous substrate which is then molded into a shaped body
are to be mentioned.

Although not limited with regard to the route to obtain shaped bodies comprising metal-organic frameworks according to the present invention, the above-recited routes are preferred within the invention disclosed herein. Presently, zeolites are the most commonly used porous active materials that are either molded into shaped bodies or applied onto a (porous) support.

For the step of preparing shaped bodies containing at least one metal-organic framework material, all processes of molding a powder and/or crystallites together that are known to the expert are conceivable. Also, all processes of applying an active component, such as the metal-organic framework material, onto a substrate are conceivable. Preparing shaped bodies by a process involving molding is described first, followed by a description of the process of applying said material onto a (porous) substrate.

In the context of the present invention, the term "molding" refers to any process known to the expert in the field by which a substance that does not fulfill the above-mentioned requirement of a shaped body, i.e. any powder, powdery substance, array of crystallites etc., can be formed into a shaped body that is stable under the conditions of its intended use.

While the step of molding at least one metal-organic framework material into a shaped body is mandatory, the following steps are optional according to the present invention:

(I) the molding may be preceded by a step of mixing, (II) the molding may be preceded by a step of preparing a paste-like mass or a fluid containing the metal-organic framework, for example by adding solvents, binders or other additional substances, (III) the molding may be followed by a step of finishing, in particular a step of drying.

The mandatory step of molding, shaping or forming may be achieved by any method known to expert to achieve agglomeration of a powder, a suspension or a paste-like mass. Such methods are described, for example, in Ullmann's Enzylopädie der Technischen Chemie, 4$^{th}$ Edition, Vol. 2, p. 313 et seq., 1972, whose respective content is incorporated into the present application by reference.

In general, the following main pathways can be discerned: (i) briquetting, i.e. mechanical pressing of the powdery material, with or without binders and/or other additives, (ii) granulating (pelletizing), i.e. compacting of moistened powdery materials by subjecting it to rotating movements, and (iii) sintering, i.e. subjecting the material to be compacted to a thermal treatment. The latter is somewhat limited for the material according to the invention due to the limited temperature stability of the organic materials (see discussion below).

Specifically, the molding step according to the invention is preferably performed by using at least one method selected from the following group: briquetting by piston presses, briquetting by roller pressing, binderless briquetting, briquetting with binders, pelletizing, compounding, melting, extruding, co-extruding, spinning, deposition, foaming, spray drying, coating, granulating, in particular spray granulating or granulating according to any process known within the processing of plastics or any combination of at least two of the aforementioned methods.

The preferred processes of molding are those in which the molding is affected by extrusion in conventional extruders, for example such that result in extrudates having a diameter of, usually, from about 1 to about 10 mm, in particular from about 1.5 to about 5 mm. Such extrusion apparatuses are described, for example, in Ullmann's Enzylopädie der Technischen Chemie, 4th Edition, Vol. 2, p. 295 et seq., 1972. In addition to the use of an extruder, an extrusion press is preferably also used for molding.

The molding can be performed at elevated pressure (ranging from atmospheric pressure to several 100 bar), at elevated temperatures (ranging from room temperature to 300° C.) or in a protective atmosphere (noble gases, nitrogen or mixtures thereof). Any combinations of these conditions is possible as well.

The step of molding can be performed in the presence of binders and/or other additional substances that stabilize the materials to be agglomerated. As to the at least one optional binder, any material known to expert to promote adhesion between the particles to be molded together can be employed. A binder, an organic viscosity-enhancing compound and/or a liquid for converting the material into a paste can be added to the metal-organic framework material, with the mixture being subsequently compacted in a mixing or kneading apparatus or an extruder. The resulting plastic material can then be molded, in particular using an extrusion press or an extruder, and the resulting moldings can then be subjected to the optional step (III) of finishing, for example drying.

A number of inorganic compounds can be used as binders. For example, according to U.S. Pat. No. 5,430,000, titanium dioxide or hydrated titanium dioxide is used as the binder. Examples of further prior art binders are:

hydrated alumina or other aluminum-containing binders (WO 94/29408);

mixtures of silicon and aluminum compounds (WO 94/13584);

silicon compounds (EP-A 0 592 050);

clay minerals (JP-A 03 037 156);

alkoxysilanes (EP-B 0 102 544);

amphiphilic substances;

graphite.

Other conceivable binders are in principle all compounds used to date for the purpose of achieving adhesion in powdery materials. Compounds, in particular oxides, of silicon, of aluminum, of boron, of phosphorus, of zirconium and/or of titanium are preferably used. Of particular interest as a binder is silica, where the $SiO_2$ may be introduced into the shaping step as a silica sol or in the form of tetraalkoxysilanes. Oxides of magnesium and of beryllium and clays, for example montmorillonites, kaolins, bentonites, halloysites, dickites, nacrites and anauxites, may furthermore be used as binders. Tetraalkoxysilanes are particularly used as binders in the present invention. Specific examples are tetramethoxysilane, tetraethoxysilane, tetrapropoxysilane and tetrabutoxysilane, the analogous tetraalkoxytitanium and tetraalkoxyzirconium compounds and trimethoxy-, triethoxy-, tripropoxy- and tributoxy-aluminum, tetramethoxysilane and tetraethoxysilane being particularly preferred.

In addition, organic viscosity-enhancing substances and/or hydrophilic polymers, e.g. cellulose or polyacrylates may be used. The organic viscosity-enhancing substance used may likewise be any substance suitable for this purpose. Those preferred are organic, in particular hydrophilic polymers, e.g., cellulose, starch, polyacrylates, polymethacrylates, polyvinyl alcohol, polyvinylpyrrolidone, polyisobutene and polytetrahydrofuran. These substances primarily promote the formation of a plastic material during the kneading, molding and drying step by bridging the primary particles and moreover ensuring the mechanical stability of the molding during the molding and the optional drying process.

There are no restrictions at all with regard to the optional liquid which may be used to create a paste-like substance, either for the optional step (I) of mixing or for the mandatory step of molding. In addition to water, alcohols may be used, provided that they are water-miscible. Accordingly, both monoalcohols of 1 to 4 carbon atoms and water-miscible polyhydric alcohols may be used. In particular, methanol, ethanol, propanol, n-butanol, isobutanol, tert-butanol and mixtures of two or more thereof are used.

Amines or amine-like compounds, for example tetraalkylammonium compounds or aminoalcohols, and carbonate-containing substances, such as calcium carbonate, may be used as further additives. Such further additives are described in EP-A 0 389 041, EP-A 0 200 260 and WO 95/19222, which are incorporated fully by reference in the context of the present application.

Most, if not all, of the additive substances mentioned above may be removed from the shaped bodies by drying or heating, optionally in a protective atmosphere or under vacuum. In order to keep the metal-organic framework intact, the shaped bodies are preferably not exposed to temperatures exceeding 300° C. However, studies show that heating/drying under the aforementioned mild conditions, in particular drying in vacuo, preferably well below 300° C. is sufficient to at least remove organic compounds out of the pores of the metal-organic framework (see the references given with respect to metal-organic frameworks above). Generally, the conditions are adapted and chosen depending upon the additive substances used.

The order of addition of the components (optional solvent, binder, additives, material with a metal-organic framework) is not critical. It is possible either to add first the binder, then, for example, the metal-organic framework material and, if required, the additive and finally the mixture containing at least one alcohol and/or water or to interchange the order with respect to any of the aforementioned components.

As far as the optional step (I) of mixing is concerned, for example, of the material containing a metal-organic framework and a binder and optionally further process materials (=additional materials), all methods known to the expert in the fields of materials processing and unit operations can be used. If the mixing occurs in the liquid phase, stirring is preferred, if the mass to be mixed is paste-like, kneading and/or extruding are preferred and if the components to be mixed are all in a solid, powdery state, mixing is preferred. The use of atomizers, sprayers, diffusers or nebulizers is conceivable as well if the state of the components to be used allows the use thereof. For paste-like and powder-like materials the use of static mixers, planetary mixers, mixers with rotating containers, pan mixers, pug mills, shearing-disk mixers, centrifugal mixers, sand mills, trough kneaders, internal mixers, internal mixers and continuous kneaders are preferred. It is explicitly included that a process of mixing may be sufficient to achieve the molding, i.e., that the steps of mixing and molding coincide.

The shaped body according to the invention is preferably characterized by at least one of the following properties:
 (i) it extends in at least one direction in space by at least 0.02 mm and that it does not extend in any direction in space by more than 50 mm.
 (ii) it is pellet shaped and has a diameter in the range from 1.5 mm to 5 mm and a height in the range from 1 mm to 5 mm.
 (iii) it has a resistance to pressure (crush strength) in the range from 2 N to 100 N.

As a second principal pathway for producing shaped bodies containing at least one metal-organic framework material, applying said material to a substrate is part of the present invention. Preferably, the substrate is porous. In principle, all techniques for contacting said material with said substrate are conceivable. Specifically, all techniques used for contacting an active material with a porous substrate known from the preparation of catalysts are applicable.

The at least one method of contacting is selected from the group comprising impregnating with a fluid, soaking in a fluid, spraying, depositing from the liquid phase, depositing from gas phase (vapor deposition), precipitating, co-precipitating, dipping-techniques, coating.

As a porous substrate, each shaped body known to the expert can be used, so long as the shaped body fulfills the general requirements concerning its geometry as specified in the present application, for example, in the points (i) to (iii) given above. Specifically, the porous substrate that will be contacted with the metal-organic framework material can be selected from the following group containing alumina, activated alumina, hydrated alumina, silica gels, silicates, diatomite, kaolin, magnesia, activated charcoal, titanium dioxide, zeolites.

While porous substrates are the preferred embodiment, contacting of the active material (metal-organic framework) with a nonporous body and/or a two-dimensional substrate are conceivable as well. In the case of applying a catalytically active material onto a non-porous shaped body, shell catalysts are obtained. Such configurations, as well as monolithic embodiments are explicitly included in the present invention, so long as they contain at least one metal-organic frame-work material.

Other embodiments customary in catalyst technologies such as application of the active substance in a washcoat and/or structuring the support in honeycombs or in channels or other skeleton-shapes are preferred.

The shaped bodies according to the invention can be used in any process known to the expert in which a porous body or a body with channels or a porous body with channels provides an advantage over solid bodies or powders. In particular, such applications include: catalysts, support for catalysts, sorption, storage of fluids, desiccants, ion exchanger materials, molecular sieves (separators), materials for chromatography, materials for the selective release and/or uptaking of molecules, molecular recognition, nanotubes, nano-reactors.

In a preferred application, the shaped bodies according to the invention are used as catalysts in fixed bed/packed bed reactors. In principle, said shaped bodies can be used in gas phase reactions or in liquid phase reactions, in which case the solid shaped bodies are suspended in a slurry. In principle, the shaped bodies according to the invention can be used to catalyze all reactions known to the expert in which the presence of channels and/or pores and/or active centers incorporated therein are known or believed to increase the activity and/or selectivity and/or yield of said reaction.

The invention is now further described by way of the following examples, which are, however, not meant to limit the scope of the present application.

EXAMPLE 1

Preparation of MOF-5

| Starting Material | Molar Amount | Calculated | Experimental |
| --- | --- | --- | --- |
| terephthalic acid | 12.3 mmol | 2.04 g | 2.04 g |
| zinc nitrate-tetra hydrate | 36.98 mmol | 9.67 g | 9.68 g |
| diethylformamide (Merck) | 2568.8 mmol | 282.2 g | 282.2 g |

The respective amounts of the starting materials given in the table above were placed in a beaker in the order diethylformamide, terephthalic acid and zinc nitrate. The resulting solution was introduced into two autoclaves (250 ml), having inner walls which were covered by teflon.

The crystallization occurred at 105° C. and within twenty hours. Subsequently, the orange solvent was decanted from the yellow crystals, said crystals were again covered by 20 ml dimethylformamide, the latter again being decanted. This procedure was repeated three times. Subsequently, 20 ml chloroform were poured onto the solid, which was washed and decanted by said solvent two times.

The crystals (14.4 g), which were still moist, were introduced into a vacuum device and first dried at room temperature in vacuo ($10^{-4}$ mbar). Afterwards, they were dried at 120° C.

Subsequently, the resulting product was characterized by X-ray powder diffraction and an adsorptive determination of micropores. The determination of the sorption isotherm with argon (87K; Micromeritics ASAP 2010) shows an isotherm of the type I, being characteristic of microporous materials and having a specific surface area of 3020 m²/g, calculated according to Langmuir, as well as a micropore volume of 0.97 ml/g (at a relative pressure of $p/p^0=0.4$).

EXAMPLE 2

Preparing Pellets Containing MOF-5

Pressing of the pellets according to the invention was performed by means of an eccentric press as provided by Korsch (Type EK0). Here, the pellet-forming tool was chosen to be a matrix with a hole of a diameter of 4.75 mm, thus leading to pellets of 4.75 mm diameter. The mixture that was fed into the eccentric press consisted of 99.8% MOF-2 and 0.2% graphite, namely of 49.9 g MOF-5 powder and 0.1 g graphite. The two components have been mixed thoroughly in a mixing flask. The procedure was performed under nitrogen atmophere.

The adjustments of the eccentric press were as follows: (i) filling height: 10 mm, (ii) penetrating depth of the upper stamp: 7 mm and (iii) rounds per minute of the rotor: 20.

The shape of the pellet was as follows: (i) diameter: 4.75 mm and (ii) height: 3 mm.

After the pellet-forming, the lateral pressure resistance to pressure (crush strength) was measured with a hardness grading device by Zwick to be 10 N/pellet with a standard deviation of 0.8 N/pellet.

What is claimed is:

1. A shaped body comprising a porous metal-organic framework material, prepared by molding a composition comprising a porous metal-organic framework material or contacting at least one substrate with at least one metal-organic framework material, wherein said metal-organic framework material comprises at least one metal ion and at least one at least bidentate organic compound which is coordinately bonded to said metal ion;

wherein the shaped body extends in at least one direction in space by at least 0.02 mm and does not extend in any direction in space by more than 50 mm; and wherein the shaped body has a resistance to pressure (crush strength) in the range of from 2 N to 100 N.

2. The shaped body according to claim 1, wherein the shaped body is in the form of a pellet having a diameter in the range from 1.5 mm to 5 mm and a height in the range from 1 mm to 5 mm.

3. A process for preparing the shaped body according to claim 1, wherein the shaped body is prepared by at least one step of molding a composition comprising a porous metal-organic framework material.

4. The process according to claim 3, wherein said molding is selected from the group consisting of briquetting by piston presses, briquetting by roller pressing, binderless briquetting, briquetting with binders, pelleting, compounding, melting, extruding, co-extruding, spinning, deposition, foaming, spray drying, coating, granulating and spray granulating.

5. The process according to claim 3, wherein the composition further comprises at least one binder, and the binder is selected from the group consisting of a hydrated alumina or other aluminum containing binders, mixers of silicon and aluminum compounds, silicon compounds, clay minerals, alkoxysilanes, amphiphilic substances and graphite.

6. A process for preparing a shaped body according to claim 1, comprising contacting at least one substrate with at least one metal-organic framework material.

7. The process according to claim 6, wherein said contacting is selected from the group consisting of impregnating said substrate with a fluid comprising the metal-organic framework material, soaking said substrate in a fluid comprising the metal-organic framework material, spraying said substrate the metal-organic framework material, depositing the metal-organic framework material from the liquid phase on the substrate, depositing the metal-organic framework material from the gas phase (vapor deposition) on the substrate, precipitating the metal-organic framework material on the substrate, co-precipitating the metal-organic framework material on the substrate, dipping substrate in the metal-organic framework material, and coating the substrate with the metal-organic framework material.

8. The process according to claim 3, wherein the shaped body has at least one of the following features:

(i) the shaped body is in the form of a monolith, (ii) the shaped body is in the form of a two-dimensional body, (iii) the metal organic framework material is part of a wash-coat, (iv) the shaped body has a skeleton-like or a honeycomb-like topology.

9. The process according to claim 6, wherein the shaped body has at least one of the following features:

(i) the shaped body is in the form of a monolith, (ii) the shaped body is in the form of a two-dimensional body, (iii) the metal organic framework material is part of a wash-coat, (iv) the shaped body has a skeleton-like or a honeycomb-like topology.

10. A reaction comprising reacting reactants in the presence of the shaped body of claim 1, wherein said reacting is carried out in a fixed bed reactor, a packed bed reactor, or said shaped body is suspended in a slurry.

11. A catalyst comprising the shaped body of claim 1.

12. A catalyst support comprising the shaped body of claim 1.

13. A sorption material comprising the shaped body of claim 1.

14. A fluid storage material comprising the shaped body of claim 1.

15. A dessicant comprising the shaped body of claim 1.

16. An ion exchange material comprising the shaped body of claim 1.

17. A molecular sieve comprising the shaped body of claim 1.

18. A chromatography material comprising the shaped body of claim 1.

19. A selective release material comprising the shaped body of claim 1.

20. A material for absorbing or adsorbing molecules comprising the shaped body of claim 1.

21. A molecular recognition material comprising the shaped body of claim 1.

22. A nanotube comprising the shaped body of claim 1.

23. A nano-reactor comprising the shaped body of claim 1.

* * * * *